United States Patent
Engelen et al.

(10) Patent No.: US 8,934,193 B2
(45) Date of Patent: Jan. 13, 2015

(54) TRANSPORT SYSTEM FOR TRANSPORTING MAGNETIC TAPE

(71) Applicant: International Business Machines Corporation, Armonk, NY (US)

(72) Inventors: Johan B. C. Engelen, Zurich (CH); Simeon Furrer, Zurich (CH); Mark A. Lantz, Zurich (CH)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/933,922

(22) Filed: Jul. 2, 2013

(65) Prior Publication Data
US 2014/0029134 A1 Jan. 30, 2014

(30) Foreign Application Priority Data

Jul. 27, 2012 (GB) .................................. 1213406.0

(51) Int. Cl.
| G11B 19/20 | (2006.01) |
| G11B 5/008 | (2006.01) |
| G11B 15/00 | (2006.01) |
| G11B 15/60 | (2006.01) |
| G11B 15/62 | (2006.01) |

(52) U.S. Cl.
CPC ............ *G11B 5/00813* (2013.01); *G11B 19/20* (2013.01); *G11B 15/00* (2013.01); *G11B 15/602* (2013.01); *G11B 15/62* (2013.01)
USPC ......................................................... 360/82

(58) Field of Classification Search
USPC .............................................. 360/82, 81, 85
See application file for complete search history.

(56) References Cited

U.S. PATENT DOCUMENTS

| 2,956,718 | A |   | 10/1960 | Beveridge |
| 3,030,524 | A |   | 4/1962 | Miller |
| 3,063,053 | A | * | 11/1962 | Blake et al. ................ 346/150.1 |
| 4,197,970 | A |   | 4/1980 | Plumadore |
| 4,285,020 | A | * | 8/1981 | Sato .............................. 360/132 |
| 4,712,148 | A |   | 12/1987 | Balz et al. |
| 4,737,809 | A | * | 4/1988 | Konno .......................... 396/542 |
| 5,475,548 | A |   | 12/1995 | Rudi et al. |
| 7,295,402 | B2 | * | 11/2007 | Okawa et al. ............ 360/130.21 |
| 7,649,710 | B2 |   | 1/2010 | Bui et al. |
| 7,961,430 | B2 |   | 6/2011 | Biskeborn et al. |
| 8,054,577 | B2 |   | 11/2011 | Eaton, Deceased et al. |

(Continued)

FOREIGN PATENT DOCUMENTS

| EP | 0690442 | A2 | 1/1996 |
| GB | 865582 |   | 4/1961 |

(Continued)

OTHER PUBLICATIONS

GB Search Report, Intellectual Property Office; Application No. GB1213405.2; Patents Act 1977: Search Report Under Section 17(5); Date Mailed: Nov. 28, 2012; pp. 1-5.

(Continued)

*Primary Examiner* — Allen T Cao
(74) *Attorney, Agent, or Firm* — Cantor Colburn LLP

(57) ABSTRACT

A transport system for transporting magnetic tape includes at least one roller for guiding the magnetic tape having at least one electrode, wherein the at least one electrode is configured to be charged triboelectrically so as to produce a force of attraction between the magnetic tape and the at least one electrode.

14 Claims, 3 Drawing Sheets

(56) References Cited

U.S. PATENT DOCUMENTS

| | | | |
|---|---|---|---|
| 2005/0105210 A1* | 5/2005 | Okawa et al. | 360/93 |
| 2008/0247076 A1 | 10/2008 | Ycas | |
| 2009/0001206 A1 | 1/2009 | Ycas | |
| 2009/0001207 A1 | 1/2009 | Tresso et al. | |
| 2009/0201609 A1 | 8/2009 | Argumedo et al. | |

FOREIGN PATENT DOCUMENTS

| | | | |
|---|---|---|---|
| GB | 1500829 | | 2/1978 |
| GB | 2196927 | A | 5/1988 |
| JP | 04216348 | | 8/1992 |
| JP | 07182732 | | 7/1995 |
| JP | 11279764 | A * | 10/1999 |
| JP | 2000251348 | | 9/2000 |
| JP | 2005247475 | | 9/2009 |
| JP | 2011175687 | A | 9/2011 |
| WO | 9113017 | | 9/1991 |

OTHER PUBLICATIONS

GB Search Report, Intellectual Property Office; Application No. GB1213406.0; Patents Act 1977: Search Report Under Section 17(5); Date Mailed: Nov. 28, 2012; pp. 1-4.

Gentilini et al., "Lateral Tape Motion Control With Robust Performance Evaluation Based on RBode Plot," IEEE Transactions on Industrial Electronics, vol. 59, No. 10, Oct. 2012, 8 pages.

Boettcher et al., "Dynamic Modeling and Control of a Piezo-Electric Dual-Stage Tape servo Actuator," IEEE Transactions on Magnetics, vol. 45, No. 7, Jul. 2009, 8 pages.

Raeymaekers et al., "The Effect of Friction between a Cylindrical Guide and Magnetic Tape on Lateral Tape Motion," Center for Magnetic Recording Research, 6 pages.

Pantazi et al., "Track-following in tape storage: Lateral tape motion and control," Elsevier Mechatronics, vol. 22, 2012, pp. 361-367.

* cited by examiner

TRANSPORT SYSTEM FOR TRANSPORTING MAGNETIC TAPE

PRIORITY

This application claims priority to Great Britain Application No. 1213406.0, filed 27 Jul. 2012, and all the benefits accruing therefrom under 35 U.S.C. §119, the contents of which in its entirety are herein incorporated by reference.

BACKGROUND

The invention relates to a transport system for transporting magnetic tape, an apparatus, in particular for data storage and/or writing servo patterns, and a method for operating a transport system for transporting magnetic tape.

In modern tape systems, data is organized in data tracks which are written and read back in a parallel fashion by a read and write head comprising servo read, data read and data write elements, i.e., transducer elements. These data tracks run in the longitudinal direction of the magnetic tape and are much narrower than the excursions the magnetic tape experiences in the lateral direction (also referred to as lateral tape motion, "LTM") as a result of imperfections in the mechanical entrainment system. Therefore, it is crucial to accurately position the head relative to the magnetic tape in the lateral direction, and to maintain this relative position as the magnetic tape is streamed. To this end, as well as for other purposes, media manufacturers write servo tracks on the magnetic tape parallel to and interleaved with the data tracks. The servo read elements read the servo information stored in the servo tracks, which is then used for aligning the head with the data tracks on the magnetic tape.

Servo tracks are typically written to the magnetic tape using one servo write element for each servo track. Each servo write element generally comprises a yoke having one or more gaps and a coil for producing a magnetic field at each gap. The write elements are configured to imprint a specific pattern on the magnetic tape via fringing magnetic fields. This pattern contains the information required to determine the instantaneous lateral location of the data read and write elements (or the head as a whole) using a timing-based-servo (TBS) scheme as for example described in EP 0 690 442 A2.

TBS is a technology that was developed specifically for linear tape drives. It has been adopted by the Linear Tape Open (LTO) Consortium as a standard for the so-called LTO tape drive systems. In TBS systems, servo patterns generally comprise chevron shapes, having magnetic transitions with two different azimuthal slopes. An estimate of the head position is derived from the relative timing of pulses (also known as di-bits) generated by the read element reading the servo pattern.

However, due to limited bandwidth and slew rate of the head actuating system, the head cannot follow high frequency or large amplitude LTM. This is why in some known transport systems magnetic tape is transported from a cartridge reel to a take-up reel via a plurality of rollers having flanges on both ends to mechanically constrain LTM.

SUMMARY

In one embodiment, a transport system for transporting magnetic tape includes at least one roller configured to guide the magnetic tape having at least one electrode; wherein the at least one electrode is configured to be charged triboelectrically so as to produce a force of attraction between the magnetic tape and the at least one electrode.

In another embodiment, a method is disclosed for operating a transport system for transporting magnetic tape, wherein at least one electrode of a roller for guiding the magnetic tape is charged triboelectrically, thereby producing a force attracting the magnetic tape to the at least one electrode.

BRIEF DESCRIPTION OF THE SEVERAL VIEWS OF THE DRAWINGS

In the following, exemplary embodiments of the present invention are described with reference to the enclosed figures.

Figure 1:
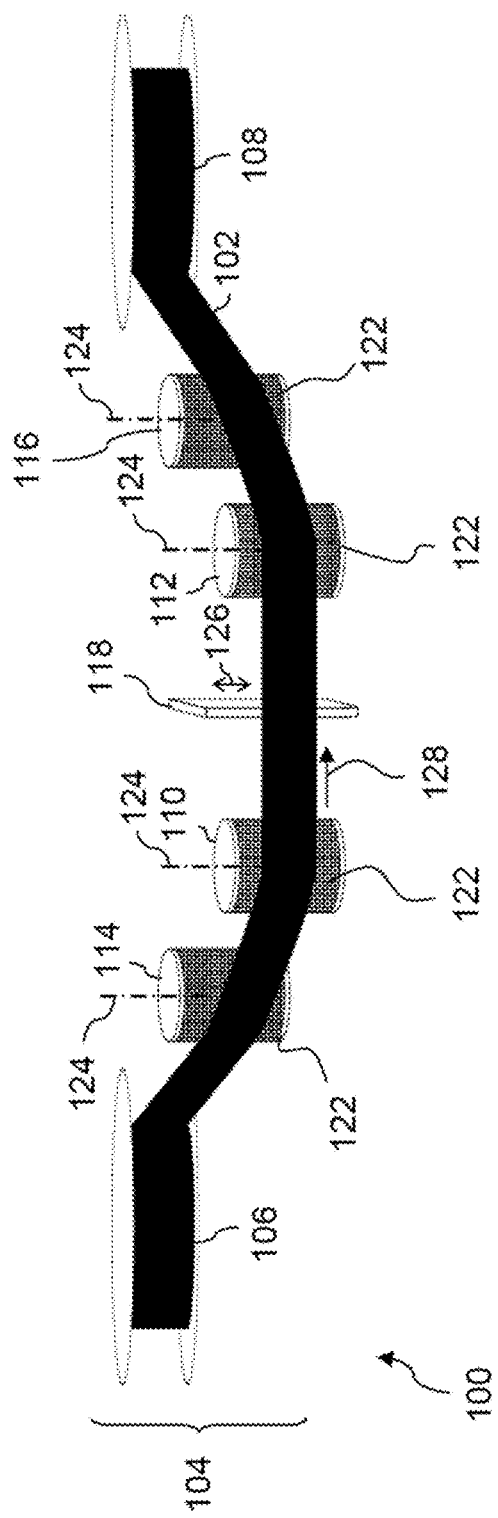
FIG. 1 shows, in a perspective view, an apparatus according to one embodiment.

In the Figures, same reference signs refer to the same or functionally equivalent elements unless otherwise indicated.

DETAILED DESCRIPTION

According to one aspect, a transport system for transporting magnetic tape is provided. The transport system comprises at least one roller for guiding the magnetic tape having at least one electrode. The at least one electrode is triboelectrically chargeable, i.e., configured to be charged triboelectrically so as to produce a force of attraction between the magnetic tape and the at least one electrode.

When the at least one electrode is charged triboelectrically by for example coming into contact with the magnetic tape, image charges appear on the magnetic tape, i.e., there is a charge separation within the magnetic tape due to the external electric field generated by the at least one electrode. As a result, the magnetic tape is attracted to the at least one electrode and forced against the roller surface when the magnetic tape is moving, thus generating friction forces that reduce LTM. The friction forces may act in a direction parallel to a roller longitudinal axis.

Triboelectric charging is a type of contact electrification in which certain materials become electrically charged after they come into contact with another different material through friction, e.g., rolling or sliding friction (rubbing is not required but may enhance triboelectric charging). After coming into contact, charges move from one material to the other to equalize their electrochemical potential. This is what creates the net charge imbalance between the objects. When separated, some of the bonded atoms have a tendency to keep extra electrons, and some a tendency to give them away, though the imbalance will be partially destroyed by tunneling or electrical breakdown (usually corona discharge). In addition, some materials may exchange ions of differing mobility, or exchange charged fragments of larger molecules.

The charge provided to the at least one electrode through triboelectric charging may exert a force per area of up to $10^6$ $N/m^2$.

Typically, magnetic tape comprises a number of thin conductive and dielectric layers. The resistivity of the magnetic tape may range from $10^5 \Omega$ per square to $10^9 \Omega$ per square.

The at least one electrode may form a part of or the entire roller (circumferential) surface. The roller surface is that part of the roller in contact with the magnetic tape during transport of the same.

In one embodiment, a plurality of electrodes is provided, each electrode being configured to be charged triboelectrically so as to produce a force of attraction between the magnetic tape and the electrodes. The electrodes may be spaced out over the roller (circumferential) surface. The magnetic tape is thus attracted uniformly to the roller surface.

According to a further embodiment, the electrodes are formed as islands embedded in a circumferential surface of the roller, the islands and/or the circumferential surface being configured for contacting the magnetic tape. Alternatively, the electrodes may also be arranged on top of the circumferential surface of the roller.

According to a further embodiment, the islands are electrically isolated from each other. In particular, electric isolation may be provided by the circumferential surface of the at least one roller. This will reduce electrical dissipation of the triboelectric charge.

According to a further embodiment, the islands have a top surface flush with the circumferential surface of the at least one roller. This may reduce or prevent wear on the magnetic tape resulting from the islands.

According to a further embodiment, the islands each have a round shape. Alternatively, the islands may have a square, rectangular or oval shape, for example.

According to a further embodiment, the islands are arranged spaced apart from each other in a circumferential direction of the at least one roller and/or in a longitudinal direction of the at least one roller. In this manner, the plurality of electrodes may be spaced out so as to uniformly attract the magnetic tape.

As an alternative to the island configuration as explained above, the at least one electrode may also have, with respect to a roller longitudinal axis, multiple circular or helical turns. In this manner, the magnetic tape may be attracted uniformly to the entire roller surface. Further, helical turns can be easily manufactured, for example by winding the at least one electrode around the roller longitudinal axis. Also, at least two or three electrodes, each configured for triboelectric charging of the same may be formed as a double or triple helix. The two or three electrodes can be easily manufactured, for example by winding simultaneously the two or three electrodes around the roller turning axis.

According to a further embodiment, the circumferential surface of the roller may comprise an electrically insulating material, in particular a ceramic material. For example aluminum oxide may be a suitable insulating material.

According to a further embodiment, the at least one electrode comprises metal. The electrode may also exclusively consist of metal. One example for a suitable metal is nickel-iron.

The at least one electrode may be formed as a wire, strip or a plate material, for example.

According to a further embodiment, the at least one roller is configured as a flangeless roller. Having no flanges prevents tape edge damage and the build-up of wear debris on the roller.

The at least one roller may be tilted with respect to the direction of travel of the tape to provide a tape-steering effect.

According to a further embodiment, the at least one roller is supported for rotation about its longitudinal axis, or is rotationally fixed. Whereas a roller being supported for rotation may reduce wear of the magnetic tape, a rotationally fixed roller may increase rubbing between the magnetic tape and the roller surface, thus increasing triboelectric charging and thus attraction forces between the magnetic tape and the roller surface. This again may reduce LTM.

According to a further embodiment, the at least one roller has at least one groove for removing air between the at least one roller and the magnetic tape. Removing the air improves contact and thus friction between the magnetic tape and the roller.

According to a further embodiment, the at least one groove extends between at least two electrodes.

Further, an apparatus, in particular for data storage and/or writing servo patterns, is provided. The apparatus comprises a magnetic tape and a transport system in accordance with the present invention.

The apparatus may comprise at least one head having one or more data and/or servo read and/or write elements for reading and/or writing of data and/or servo tracks. The head may be formed as a servo write head. At least one write element of the write head may comprise a yoke having at least one, preferably at least two gaps, and a coil for producing a magnetic field at the gap. Typically, the coil comprises a plurality of windings. A "gap" presently refers to an interruption in the yoke defined between opposite magnetic poles. The yoke comprises a magnetic material, for example iron, and is magnetized when a current flows through the coil. The yoke may be ring-shaped.

The head, in particular the read and/or write element(s), may be assembled from separately fabricated parts, or built-up from a planar substrate using thin-film microfabrication techniques. The latter presents advantages in terms of fabrication and decreased inductance and current, which enable writing more abrupt servo patterns and/or formatting the magnetic media at a greater speed. For example, the head and/or the read and/or write element may be built on a wafer, for example a silicon or AlTiC (Aluminum-Titanium-Carbide) wafer.

The head, in particular the servo write head, may be a planar head comprising a planar (also referred to as pancake) coil. Alternatively, the head, in particular the servo write head, may comprise a helical coil. A combination of planar or helical coils is also possible.

The apparatus may comprise a cartridge reel and a take-up reel. One or more rollers may guide the magnetic tape from the cartridge reel to the take-up reel.

Further, a method for operating a transport system for transporting magnetic tape is provided. At least one electrode of a roller for guiding the magnetic tape is charged triboelectrically, thereby producing a force attracting the magnetic tape to the at least one electrode.

Features and advantages explained above in the context of the transport system apply mutatis mutandis to the apparatus and the method of the present invention.

FIG. 1 shows an apparatus 100 for data storage and/or writing servo patterns. The apparatus 100 comprises a magnetic tape 102 which is transported by a transport system 104. The transport system 104 has a cartridge reel 106, a take-up reel 108 and a plurality of rollers 110, 112, 114, 116 which guide the magnetic tape 102 from the cartridge reel 106 to the take-up reel 108. Generally, between two and five rollers are used. In the example, four rollers are used. The cartridge reel 106 and take-up reel 108 may be driven by electric motors (not shown). The rollers 110, 112, 114, 116, which may be configured as flangeless rollers, guide the magnetic tape 102 past a head 118 of the apparatus 100. The head 118 may comprise multiple read and/or write elements. For example, when the apparatus 100 is configured as a data storage device, the head 118 will comprise data read and write as well as servo read elements. On the other hand, when the apparatus 100 is configured as a servo writer, the head 118 will comprise servo write elements configured to write a servo pattern on the magnetic tape 102.

Each (or only some) of the rollers 110, 112, 114, 116 comprises an electrode 122. According to the embodiment of FIG. 1, each electrode 122 is formed as a circumferential surface of each roller 110, 112, 114, 116. The electrodes 122 are in direct contact with the magnetic tape 102 as the rollers 110, 112, 114, 116 turn about their respective longitudinal axes 124. The rollers 110, 112, 114, 116 may also be configured as being stationary, i.e., non-rotating, about their respective longitudinal axis 124.

The electrodes 122 of each roller 110, 112, 114, 116 are configured to be charged triboelectrically, when they are being contacted by the magnetic tape 102 as the magnetic tape 102 moves from the cartridge reel 106 to the take-up reel 108 during operation of the apparatus 100. This triboelectric charging produces a force of attraction between the magnetic tape 102 and a respective electrode 122. This force of attraction acts normal, i.e., perpendicular to the surface of the roller. The magnetic tape 102 is thus pulled against the surface of the roller, and friction forces result. These friction forces reduce a movement of the magnetic tape 102 with respect to the roller surface in a direction parallel to a respective roller longitudinal axis 124 and/or with respect to the head 118. This movement is indicated at 126 and referred to as LTM herein. Decreasing LTM improves track-follow performance of the head 118.

Figure 2:
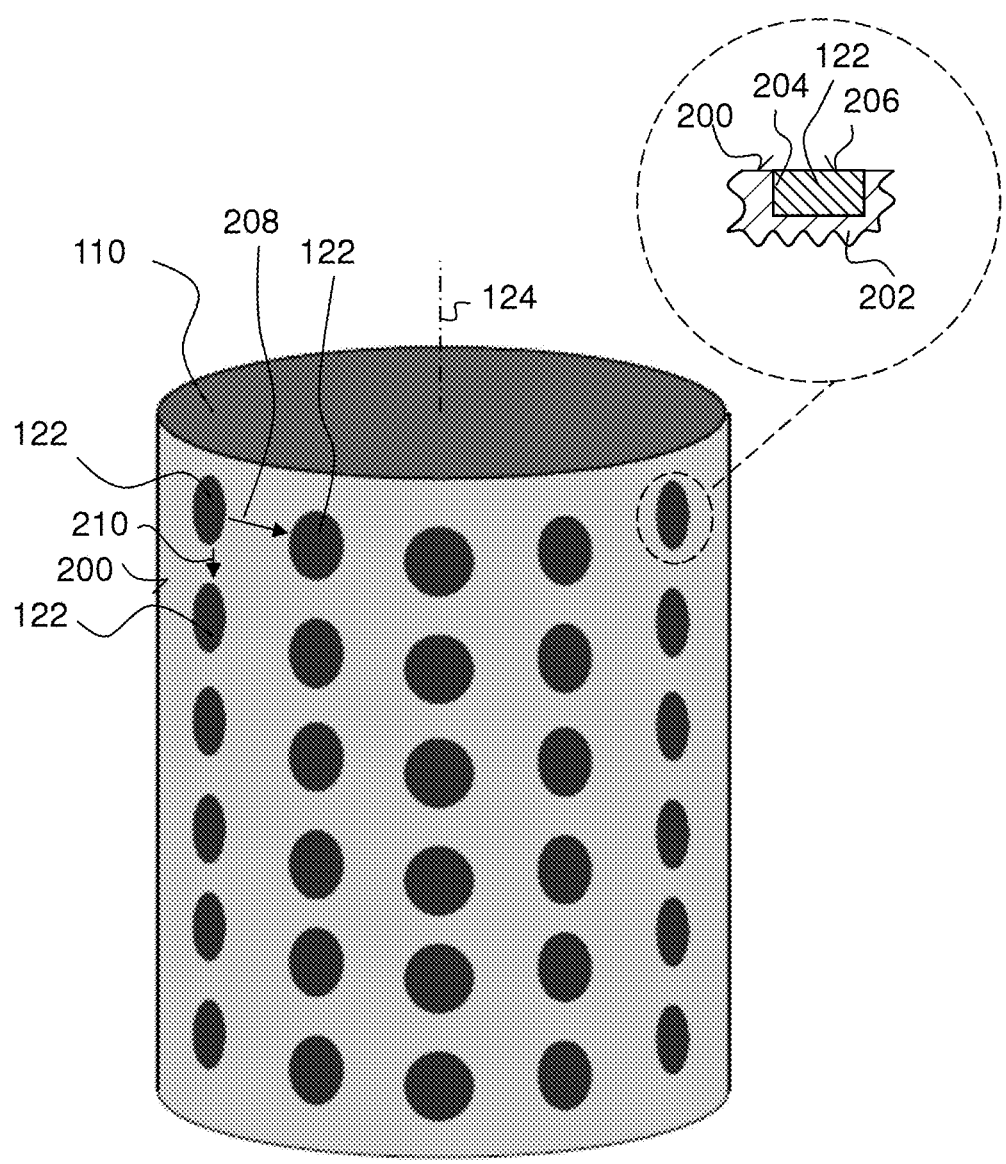
FIG. 2 shows, in a perspective view, a roller according to one embodiment.

FIG. 2 illustrates, in a perspective view, a roller 110 according to one embodiment. The roller 110 may be used instead of one or more of the rollers 110, 112, 114, 116 of FIG. 1.

The roller 110 has a plurality of electrodes 122. The electrodes 122 are each configured to be charged triboelectrically so as to produce a force of attraction between the magnetic tape 102 and the electrodes 122. The electrodes 122 are formed as islands embedded in a circumferential surface 200 of the roller 110. This is illustrated in the enlarged partial cross-section shown in FIG. 2. The roller 110 has a base material or shell 202 forming the circumferential surface 200 on the outside. The base material 202 is formed as an electrical isolator. For example, the base material 202 may be formed from a ceramic, e.g., aluminum oxide. The base material 202 has receptacles 204 inside of which the islands 122 are arranged. Preferably, a top surface 206 of a respective island 122 is flush with the circumferential surface 200 of the base material 202. The islands 122 may comprise a metal, for example copper, and have a round shape as seen in a direction normal to the circumferential surface 200. The islands 122 may be spaced apart from each other in a circumferential direction 208 and in a longitudinal direction 210, i.e., parallel to the longitudinal axis 124.

Triboelectric charging results from the contact between the magnetic tape 102 and the top surface 206 of a respective island 122. The force of attraction between the magnetic tape 102 and the islands 122 acts normal, i.e., perpendicular, to the surfaces 200, 206. Friction forces result from the magnetic tape 102 being pulled against the circumferential surface 200 and/or the top surface 206. Generally speaking, materials for the islands 122 and the magnetic tape 102 are chosen so as to obtain the desired triboelectric effect in order to in turn obtain the desired friction forces, which will reduce or prevent LTM.

The electrodes 122 may also have other shapes than the ones shown in FIG. 1 or 2. For example, the electrodes 122 may have a spiral shape spiraling around the longitudinal axis 124. Or, the islands 122 arranged on a single roller 110 may be of varying shapes. For example, one island 122 may have a round shape, whereas another island 122 may have a square or rectangular shape.

Further, the rollers 110 may be arranged such that their longitudinal (turning) axis 124 is tilted with respect to a direction of travel 128 (see FIG. 1) of the magnetic tape 102.

Figure 3:
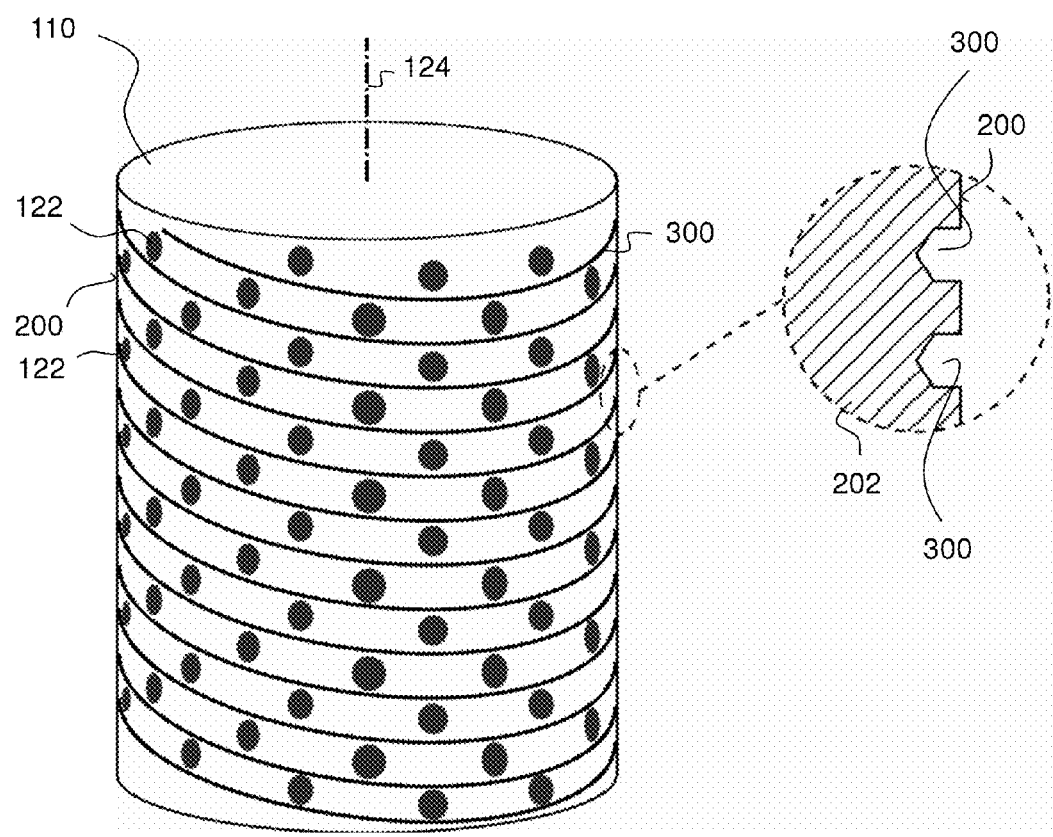
FIG. 3 shows, in a perspective view, a roller according to a further embodiment.

FIG. 3 illustrates a roller 110 having one or more grooves 300. The grooves 300 may be formed inside the base material 202. The grooves 300 may have a helical shape spiraling around the longitudinal axis 124, for example. The grooves 300 running between the electrodes 122 help remove air from the space between the circumferential surface 200 of the roller 110 and the magnetic tape 102. Removing the air improves contact and thus friction between the magnetic tape 102 and the roller 110.

More generally, while the present invention has been described with reference to certain embodiments, it will be understood by those skilled in the art that various changes may be made and equivalents may be substituted without departing from the scope of the present invention. In addition, many modifications may be made to adapt a particular situation to the teachings of the present invention without departing from its scope. Therefore, it is intended that the present invention not be limited to the particular embodiments disclosed, but that the present invention will include all embodiments falling within the scope of the appended claims. In particular, the embodiments of FIGS. 1 and 3 may be combined with one another as required.

The invention claimed is:

1. A transport system for transporting magnetic tape, comprising:
   at least one roller, having a plurality of electrodes, configured to guide the magnetic tape;
   wherein each of the electrodes is configured to be charged triboelectrically so as to produce a force of attraction between the magnetic tape and the electrodes.

2. The transport system of claim 1, wherein the electrodes are formed as islands embedded in a circumferential surface of the at least one roller, the islands and/or the circumferential surface being configured for contacting the magnetic tape.

3. The transport system of claim 2, wherein the islands are electrically isolated from each other by the circumferential surface of the at least one roller.

4. The transport system of claim 2, wherein the islands have a top surface flush with the circumferential surface of the at least one roller.

5. The transport system of claim 2, wherein the islands each have a round shape.

6. The transport system of claim 2, wherein the islands are arranged spaced apart from each other in a circumferential direction of the roller and/or in a longitudinal direction of the at least one roller.

7. The transport system of claim 2, wherein the circumferential surface of the at least one roller comprises an electrically insulating material.

8. The transport system of claim 1, wherein the at least one electrode comprises metal.

9. The transport system of claim 1, wherein the at least one roller is configured as a flangeless roller.

10. The transport system of claim 1, wherein the at least one roller is supported for rotation about its longitudinal axis, or is rotationally fixed.

11. The transport system of claim 1, wherein the at least one roller has at least one groove for removing air between the at least one roller and the magnetic tape.

12. The transport system of claim 11, wherein the at least one groove extends between at least two electrodes.

13. An apparatus for data storage and/or writing servo patterns, comprising:
   a magnetic tape; and a transport system for transporting the magnetic tape, the transport system further comprising at least one roller, having a plurality of electrodes, configured to guide the magnetic tape, wherein each of the electrodes is configured to be charged triboelectrically so as to produce a force of attraction between the magnetic tape and the electrodes.

14. A method for operating a transport system for transporting magnetic tape, the method comprising:

triboelectrically charging each of a plurality of electrodes of at least one roller configured to guide the magnetic tape, thereby producing a force attracting the magnetic tape to the electrodes.

\* \* \* \* \*